No. 745,733. Patented December 1, 1903.

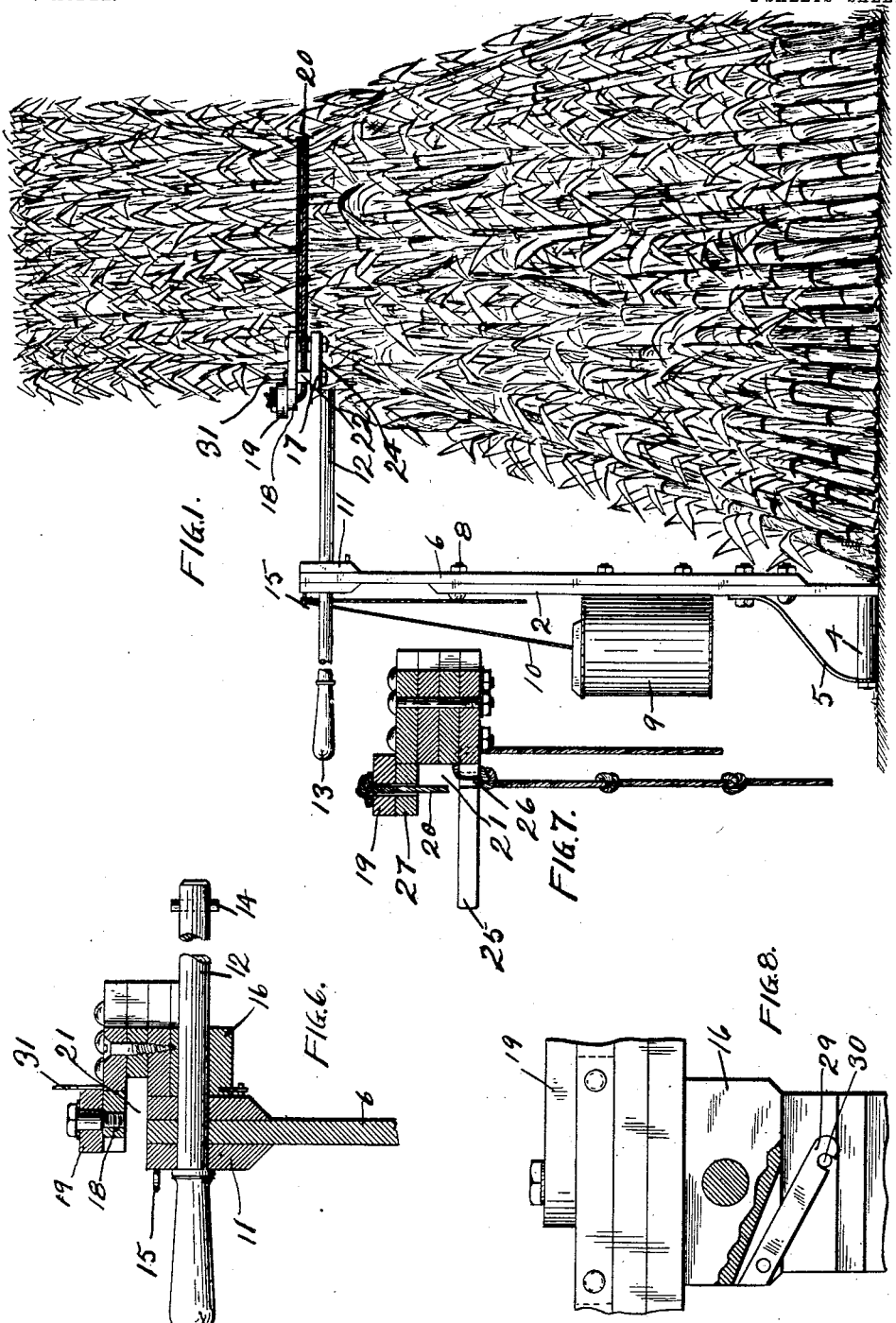

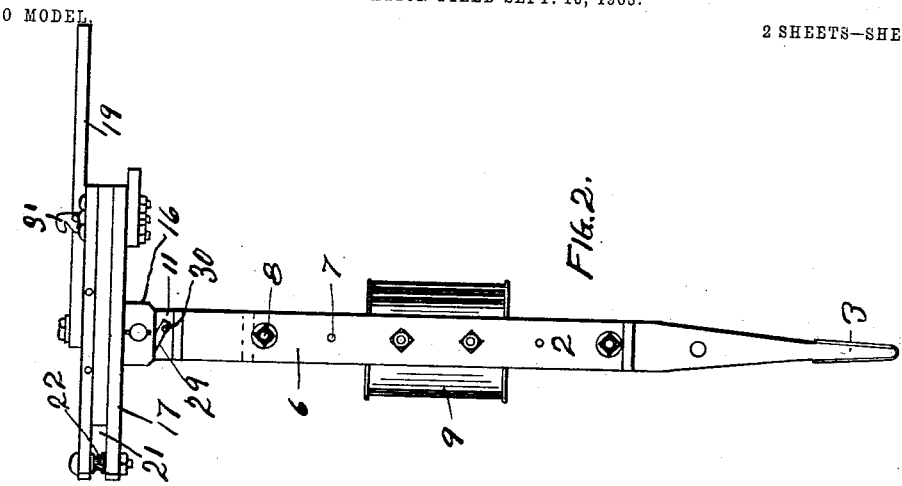
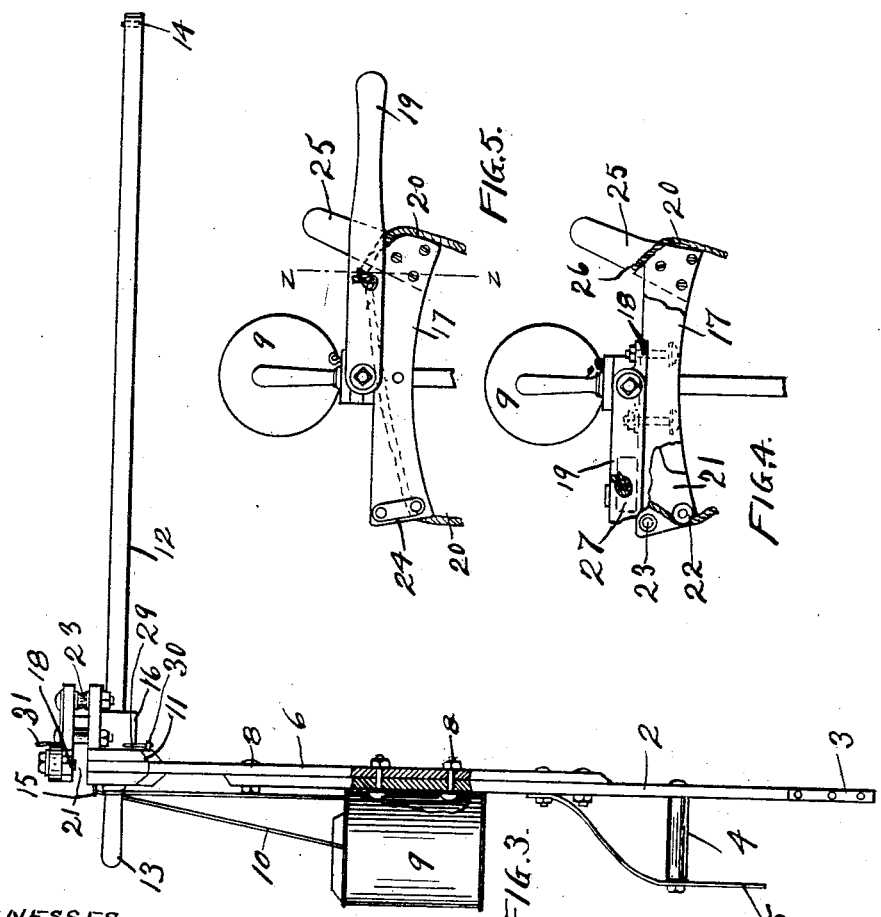

UNITED STATES PATENT OFFICE.

WALLACE B. MARTIN, OF NICKERSON, MINNESOTA.

CORN-SHOCKER.

SPECIFICATION forming part of Letters Patent No. 745,733, dated December 1, 1903.

Application filed September 16, 1903. Serial No. 173,394. (No model.)

*To all whom it may concern:*

Be it known that I, WALLACE B. MARTIN, of Nickerson, county of Pine, State of Minnesota, have invented certain new and useful Improvements in Corn-Shockers, of which the following is a specification.

The object of my invention is to provide a manually-operated shocker by means of which the corn can be easily and quickly set up in an upright position and securely bound.

A further object is to provide a shocker of simple but strong and durable construction and one that is composed of but few parts and hence comparatively inexpensive to manufacture.

Other objects of the invention will appear from the following detailed description.

The invention consists generally in various constructions and combinations, all as hereinafter described, and particularly pointed out in the claims.

In the accompanying drawings, forming part of this specification, Figure 1 is a side elevation of a corn-shocker embodying my invention, showing the completed shock. Fig. 2 is a front view of the same. Fig. 3 is a side elevation. Fig. 4 is a plan view showing the manner of securing the ends of the rope and the lever before the rope has been tightened around the shock. Fig. 5 is a similar view showing the position of the lever after the rope has been tightened. Fig. 6 is a vertical sectional view through the center of the shocker. Fig. 7 is a detail sectional view on the line *z z* of Fig. 5. Fig. 8 is a detail view showing the device for locking the sliding compressor in a horizontal position.

In the drawings, 2 represents a standard having a pointed lower end 3 adapted to enter the ground and provided with a stirrup 4, by means of which the operator can force the end of the standard into the soil.

5 is an arm depending below the stirrup and adapted to enter the ground and aid in supporting the standard in an upright position.

6 is an extension provided on the upper end of the standard and adjustable thereon by means of holes 7 and bolts 8, whereby the shocker can be readily adapted for corn of different height.

9 is a twine-can preferably secured to the standard 2 by means of bolts 8 and containing a supply of twine 10, that is tied around the shock after it is formed. At the upper end of the extension 6 of the standard I provide a head 11, that forms a bearing for a longitudinally-slidable rod 12, horizontally mounted therein and provided at one end with a handle 13 and at its other end with a pin 14. An eye 15 is preferably provided on the head 11 through which the free end of the twine is threaded, where it can be conveniently reached by the operator after the shock is formed.

16 is a collar slidably mounted on the rod 12 and supporting a sliding compressor block or head 17, that is provided on its rear edge with a bearing 18, wherein a lever 19 is pivoted and to which lever one end of a rope 20 is secured. One end of the block 17 is provided with a recess 21, wherein antifriction-rollers 22 and 23 are mounted, between which the rope passes, and I prefer to provide a strap 24, connecting the pivots of these rollers to strengthen the block at the point where it is subjected to a considerable strain. The opposite end of the block 17 is provided with a rigid arm 25, having a notch 26, adapted to receive the free end of the rope after it has been passed around the shock. A series of knots are formed in the rope to prevent it from slipping through the said notch and to adapt the device for forming shocks of different size. A stop 27 is provided on the under side of the lever 19 in position to engage the block 17 and limit the oscillating movement of the lever 19. To hold the block 17 in a horizontal position on the rod 12, I prefer to provide a latch 29 thereon adapted to engage a pin 30 on the standard 6. When the latch is tripped, the block may be swung down to a vertical position in line with the standard for convenience in carrying. A knife 31 is mounted on the lever 19 within convenient reach of the operator when it is desired to cut the twine after the shock has been bound.

The operation of the device is as follows: The standard having been thrust into the ground so that the shocker will be in an upright position, and the desired amount of corn that is to form a shock placed near the standard and leaning against the same, the operator will pass the rope around the shock and slip it into the notch 26, the knot that engages the notch, depending, of course, upon the amount of corn that it is desired to put into the shock. The operator will then swing the lever 19 on its pivot around to the position shown in Fig. 5, and the rope slipping over the roller 22 as the lever is oscillated will draw the cornstalks firmly together from all sides, and as the rope will be in front of the pivot of the lever, as indicated by dotted lines in Fig. 5, the lever will be automatically locked and cannot accidentally return to its normal position and loosen the rope. The tightening of the rope around the shock will of course draw the corn snugly against the curved forward edge of the block 17, and the operator, placing one hand on the block and with the other grasping the handle 13, will pull the longitudinally-movable rod 12 in one direction and push the sliding compressor-block in the other until the block has been pressed out away from the standard to the upright position shown in Fig. 1. The twine will then be carried around the shock and tied, the lever returned to its normal position, loosening the rope, and the rod 12 being readily withdrawn from the shock the device is ready to repeat the operation. The sliding compressor block or head permits me to draw the stalks to the center from all sides and form a shock having a wide spreading base and a comparatively small compact top that will shed moisture.

I claim as my invention—

1. A corn-shocker, comprising a standard adapted to be thrust into the ground, a sliding compressor-block carried thereby and movable away from said standard to place the shock in an upright position, a flexible binder carried by said compressor-block, and means for tightening the flexible binder around a shock.

2. A corn-shocker comprising a standard adapted to be thrust into the ground, a compressor-block carried thereby and movable away from said standard to place the shock in an upright position, a flexible binder carried by said compressor-block, and an oscillating lever connected with said flexible binder and adapted to tighten the same around a shock.

3. A corn-shocker comprising a standard adapted to be thrust into the ground, a sliding member mounted in said standard, a compressor-block carried by said member and movable thereon away from said standard to place the shock in an upright position, a rope carried by said compressor-block, and means for tightening the rope around a shock.

4. A corn-shocker comprising a standard, a longitudinally-movable rod horizontally supported in said standard, a compressor-block loosely mounted on said rod, a rope secured at one end to said compressor-block, and means for drawing up the other end of said rope to tighten it around a shock.

5. The combination, with a standard adapted to be thrust into the ground, of a compressor-block supported on said standard and movable horizontally toward or from the same, means for supporting said block in a substantially horizontal position, a rope carried by said block, and means for tightening it around a shock.

6. The combination, with a standard adapted to be thrust into the ground, of a compressor-block slidably supported thereon and adapted to be moved away from said standard to place a shock in an upright position, a rope secured at one end to said block, an oscillating lever whereto the other end of said rope is attached, said lever describing a half-circle on its pivot, and said rope when tightened being in front of the pivot of said lever whereby it will remain automatically locked while the shock is being tied.

7. The combination, with a standard adapted to be thrust into the ground, of a member slidably mounted on said standard, a compressor-block loosely mounted on said member, a rope having one end secured to said block, a lever pivoted on said block and whereto the other end of said rope is attached, means for limiting the oscillating movement of said lever, and said rope being in front of the pivot of said lever, for the purpose specified.

8. The combination, with a standard adapted to be thrust into the ground, and a twine-can mounted thereon, of a rod horizontally slidable in the upper part of said standard, a compressor-block loosely mounted on said rod and movable away from said standard to place a shock in an upright position, a latch device arranged to hold said frame in a horizontal position, a rope secured at one end to said compressor, and a lever having a limited oscillating movement connected to the other end of said rope and arranged to tighten the same around a shock.

9. A corn-shocker comprising a standard having a pointed lower end adapted to be thrust into the ground, and a stirrup near said lower end to receive the foot of the operator, in combination with a rod mounted on said standard, a compressor-block slidably arranged on said rod and movable away from said standard to place a shock in an upright position, a rope secured to said block, and means for tightening the rope around a shock.

In witness whereof I have hereunto set my hand this 11th day of September, 1903.

WALLACE B. MARTIN.

In presence of—
JAS. P. BALSOM,
PEDER ERICKSON.